United States Patent [19]

Oltmann

[11] 4,054,514
[45] Oct. 18, 1977

[54] SEDIMENTATION APPARATUS WITH FLOCCULATING FEED WELL

[75] Inventor: Hans Heinrich Oltmann, Danbury, Conn.

[73] Assignee: Dorr-Oliver Incorporated, Stamford, Conn.

[21] Appl. No.: 626,401

[22] Filed: Oct. 28, 1975

Related U.S. Application Data

[63] Continuation of Ser. No. 503,478, Sept. 5, 1974, abandoned.

[51] Int. Cl.² .......................................... B01D 21/16
[52] U.S. Cl. ...................................... 210/20; 210/49; 210/60; 210/197; 210/208; 210/219; 210/530
[58] Field of Search ............ 210/49, 195 M, 207-209, 210/219, 220, 221 R, 519, 520, 523, 530, 194, 20, 60, 197; 259/7, 8

[56] References Cited

U S. PATENT DOCUMENTS

| 2,633,453 | 3/1953 | McAllister | 210/208 X |
| 2,969,149 | 1/1961 | Mackrle et al. | 210/195 M |
| 3,305,096 | 2/1967 | Schleiss | 210/195 M |
| 3,350,302 | 10/1967 | Demeter et al. | 210/49 X |
| 3,397,788 | 8/1968 | Duff et al. | 210/208 X |
| 3,532,218 | 10/1970 | Von Blottnitz et al. | 210/207 |

FOREIGN PATENT DOCUMENTS

| 197,290 | 4/1958 | Austria | 210/49 |

Primary Examiner—Thomas G. Wyse
Assistant Examiner—Robert H. Spitzer
Attorney, Agent, or Firm—Theodore M. Jablon; Burtsell J. Kearns

[57] ABSTRACT

Sedimentation apparatus which employs an agitator-equipped mixing tank for a feed suspension and a flocculating agent or flocculant, which mixing tank is located within the central feed well of a continuously operating sedimentation tank, and wherein the flocculant-treated feed suspension overflows the top end of the mixing tank, then to continue along a downward path in the surrounding feed well of the tank.

21 Claims, 5 Drawing Figures

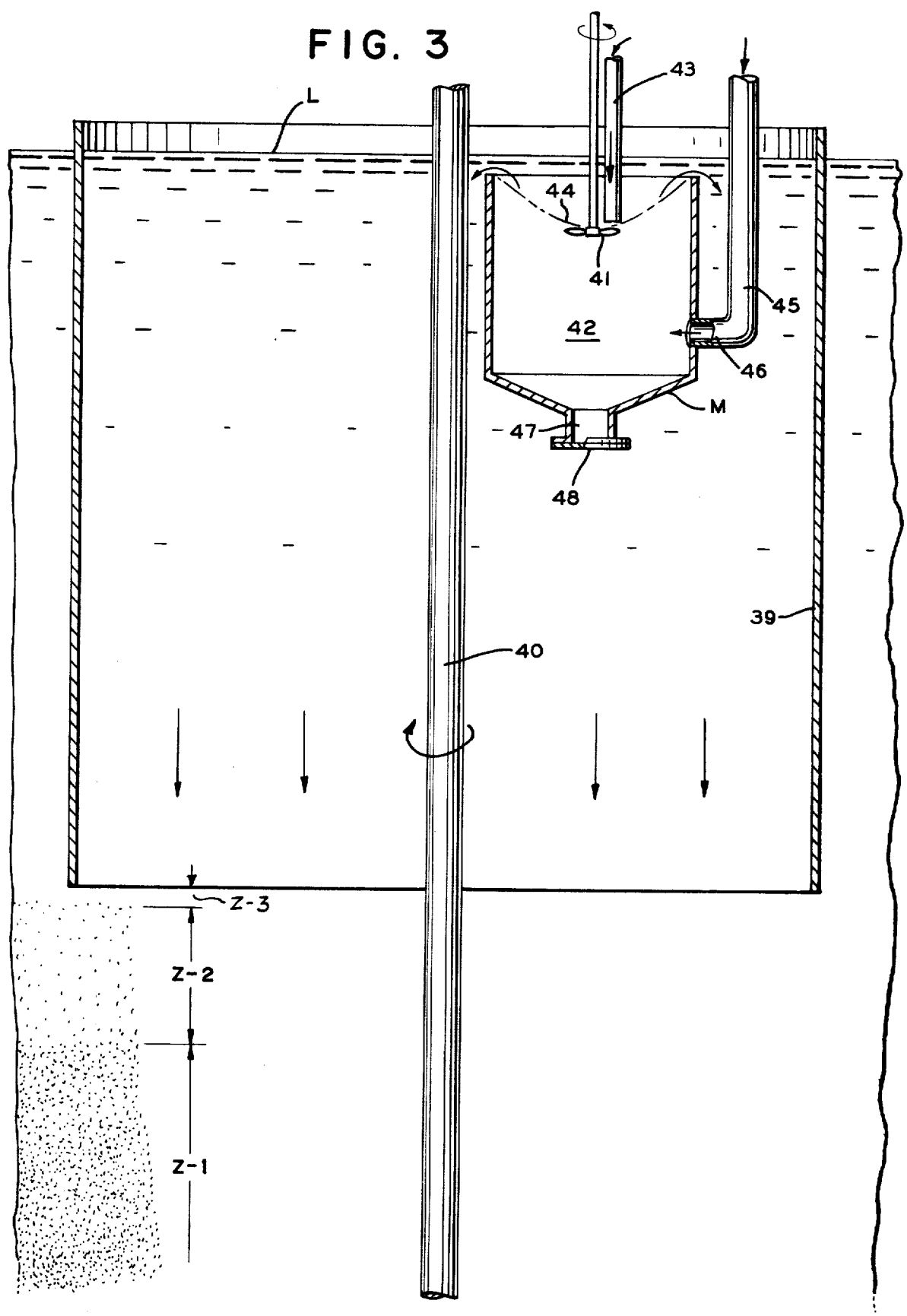

SEDIMENTATION APPARATUS WITH FLOCCULATING FEED WELL

This is a continuation, of application Ser. No. 503,478, filed Sept. 5, 1974, now abandoned.

This invention relates to sedimentation apparatus for the continuous clarification of liquids or waste streams carrying suspended solids which require treatment with suitable flocculating agents whereby these solids are caused to form settleable flocs.

More in particular, the invention may be advantageously embodied in the type of clarifier tank wherein a rotary sludge raking structure and its drive mechanism are supported by a bridge or super structure spanning the tank, with the vertical shaft of the rake structure extending downwardly through the feed well cylinder. Rotation of the rake structure moves the sludge over the tank bottom to a sludge outlet in the center for withdrawal.

The flocculated feed suspension entering the clarifier tank through a feed well at the center normally spreads out radially in all directions, allowing separated liquid or mother liquor to overflow. The flocculated material settles into a sludge bed on the tank bottom whence it may be withdrawn at a suitable rate.

The feed suspension supplied to most industrial waste stream clarifiers carries fines that must be subjected to flocculating treatment to meet effluent or overflow clarity requirements. Examples of such waste streams are represented in the effluent from gas scrubbers containing ash, flue dust etc. A metal hydroxide suspension is another example.

Usually in such cases flocculation is effected by the addition of polyelectrolytes. The dosages are relatively very small, for example in the order of 2 ppm. Such relatively minute quantities must be well distributed throughout the feed suspension in order to attain maximum flocculation, and to avoid local adsorption of the flocculating agent or flocculant. Short flash mixing is therefore usually employed.

Where the resulting flocs are very light and delicate as from the aforementioned industrial waste streams, prolonged handling causes breakdown of these flocs, so that the flocculant may become less and less effective. Such prolonged handling of the flocculated feed suspension occurs for example when the flocculant is added into the feed line ahead of the feed pump, or into a mixing tank, and then flows a considerable distance through a feed pipe into the feed well of the tank.

In the sludge bed itself there is discernable a bottom or final concentration zone, that is, the zone where the flocs or solids have attained their optimum or maximum concentration. In this state they are close enough to one another so that the void spaces between them cannot be further reduced by any further settling. This sludge containing the solids along with the entrapped liquid may be drawn from the tank bottom at a suitable rate.

Above this final concentration zone there may form a sludge blanket usually termed the compression zone wherein the solids are still in a state of downward movement relative to the liquor which separates upwardly and towards the tank overflow, as distinct from a free settling condition of the particles. While it is desirable that as many solids as possible be retained in this sludge blanket for the sake of attaining the desired overflow clarity, this goal may not be attainable, due to the presence of suspended fines or broken floc particles.

An objectionable condition then may develop due to the formation and incremental buildup of a zone or stagnant layer visible as a haze above the sludge bed proper, containing those suspended fines and broken floc particles.

This buildup of intermediates eventually shows up in the turbidity of the tank overflow, a condition which might be counteracted only by increasing the initial dosage of the flocculating agent at correspondingly higher cost for the expensive polyelectrolyte, such as the well known "Separan" made by Dow Chemical Corp. Yet, increasing the dosage is not only costly, but may also have an adverse effect upon the final sludge concentration. That is to say, with the further addition of such flocculant, the resulting flocs became more voluminous due to additional water content, thereby correspondingly reducing the final sludge concentration.

At any rate, since flocs once broken during transfer from an outside flocculant dosing and mixing device or station, will not reform with or without the aid of a flocculating agent, additional filtration treatment of the clarifier overflow may be required.

It is among the objects of this invention to avoid or eliminate the foregoing objectionable conditions affecting the effluent clarity, to relatively minimize the flocculant dosage required without impairment of effluent clarity, and to generally improve floc formation and preservation and hence the overall efficiency of the clarifier.

The foregoing objectives of the invention are attainable by the provision of what is herein termed a "flocculating feed well" which comprises a relatively small agitator-equipped mixing tank for the feed suspension and the flocculant, which mixing tank is located within or surrounded by, the feed well of the clarifier.

In a preferred form of the mixing device, the feed suspension enters the mixing tank at the bottom while the flocculant solution is added from the top at a suitable concentration. Where flash mixing is required as in the case of the aforementioned industrial waste streams, an impeller is located preferably in the upper half of the mixing tank.

The flocculant to be added is introduced into the vortex created by this agitator in the mixing tank. With the feed suspension rising through the agitator range, and with downward pumping action of the agitator or impeller, the flocculant is instantaneously and thoroughly distributed.

Immediately after mixing is accomplished in this mixing tank or device within a predeterminable detention time of say, 30 seconds, the thus treated feed suspension overflows from the mixing tank into the surrounding feed well substantially at, or slightly below the overflow level of the clarifier tank. The formation of settleable flocs occurs immediately in the feed well surrounding the mixing tank.

The flocculated solids then proceed downward in the surrounding feed well, unencumbered by any additional handling or turbulence, and will settle at a relatively constant rate onto or into the aforementioned sludge blanket, that is without forming the aforementioned objectionable intermediate zone of fines covering the area above the aforementioned sludge blanket.

For waste streams that do not require flash mixing with the flocculating agent, for example where recycling of sludge solids into the feed suspension is employed to control the feed concentration, or in the flocculating treatment of other types of waste streams, for example those of organic origin, such as sewage or sewage effluent, a gate type agitator should be employed in the mixing tank instead of the aforementioned impeller type.

In connection with the operation of the flocculating feed well of this invention, the recycling of underflow sludge solids into the feed suspension may be indicated. Such is the case, for example, with industrial waste streams containing the solids only in very low concentration, too low in fact for obtaining effective flocculation. Recyling some of the underflow sludge back into the incoming feed suspension results in higher feed concentration, thereby enabling the flocculants to become more effective, so that correspondingly better clarification is attainable.

Since the returned underflow solids are already flocculated and carrying the reagent, they will not only aid flocculation, but may further reduce the dosage requirement.

The return of underflow solids to the incoming feed suspension is closely controllable, and a very consistent feed concentration is thus attainable. However, for a given condition the sludge recirculation rate should not exceed the solids concentration at which free settling occurs.

In the operation of this invention, another aspect is concerned with structural implementation and dimensioning of the flocculating feed well, having regard to the present discovery that the diameter and length of the feed well cylinder surrounding the mixing unit are also a factor in attaining optimum floc formation, floc preservation, and floc retention in the aforementioned sludge blanket, and hence optimum effluent clarity at minimum cost in flocculants.

This calls for a deep feed well terminating relatively close to said sludge blanket, and of a diameter small enough, or else not too large and not too small, and thus adapted to maintain optimum feed concentration without undue turbulence, while holding the solids together in the flocculated feed suspension issuing from the deep feed well relatively close to the top level of the sludge blanket. For optimum results, and for average conditions, the diameter of the feed well should be so dimensioned that the downward flow velocity therein should be in the order of 4 to 5 ft/min.

The flocculating feed well of this invention operates in a manner whereby an undesirable downward plunge of the feed suspension through the cylindrical feed well as well as a concurrent undesirable turbulence therein is avoided. This is due to the fact that the flocculated feed suspension evenly overflows the mixing tank, then following a uniform downward path through the surrounding feed well cylinder.

Other features and advantages will hereinafter appear.

IN THE DRAWINGS

FIG. 3 is a greatly enlarged somewhat modified vertical sectional detail view of the flocculating feed well of this invention.

Figure 1:
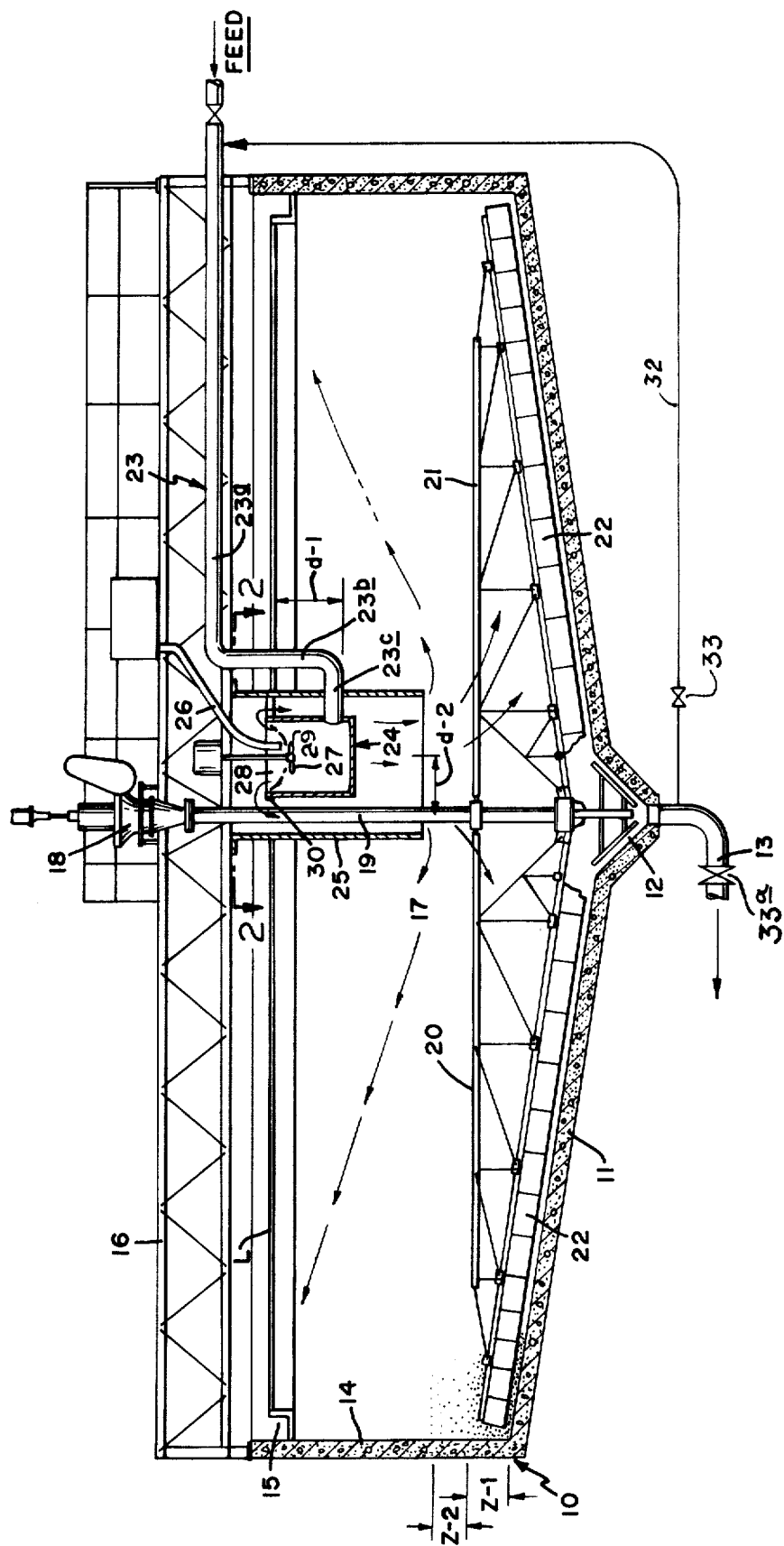
FIG. 1 is a vertical sectional view of a clarifier tank showing the flocculating feed well embodying the invention, comprising a flocculant mixing device located within the cylindrical feed well of the tank.

A clarifier tank embodying the invention by way of example as shown in FIG. 1 is of the type wherein a circular tank 10 has a shallow conical bottom 11 provided with central conical sludge discharge sump 12 connected to a sludge withdrawal pipe 13. The cylindrical wall 14 of the tank has a peripheral overflow launder 15 for clarified liquid separated from the sludge, which launder defines the liquid overflow level "L".

The tank wall supports a super structure or bridge 16 spanning the tank. A rotary sludge raking structure 17 is supported from the bridge. The rake structure is supported from a drive mechanism 18 mounted on the bridge, and comprises a downwardly extending shaft 19 carrying rigidly connected to the lower end thereof a pair of rake arms 20 and 21 which may be of conventional construction. These arms have the usual sludge conveying plowing blades 22 which move the sludge over the tank bottom to the central sump 12 for withdrawal, incident to the rotation of the rake structure by the aforementioned bridgesupported drive mechanism.

A feed suspension to be clarified is supplied to the tank through a feed pipe 23 shown to have an initial horizontal section 23a extending radially inwardly across the overflow launder of the tank, a vertical downward section 23b extending a distance "d-1" below the liquid level "L", and a submerged horizontal inner terminal section 23c leading into the bottom portion of an agitator-equipped mixing tank or mixing device 24.

The mixing tank 24 is surrounded by a cylindrical feed well 25 which is supported from the bridge, the mixing tank being shown as of exaggerated diameter and size relative to the dimensions of the surrounding feed well 25. The mixing tank being supported in fixed relationship to the feed well receives the feed suspension at the bottom while a flocculant solution through a pipe 26 is added from the top.

In this embodiment, the mixing device is shown to be in the nature of a flash mixer, to the provision of an impeller type agitator 27 whereby a vortex 28 is maintainable in the contents of the mixer tank. The flocculant section is advantageously introduced from above into this vortex and just above the impeller blade 29, whereby a thorough and instantaneous mixing is achieved with the feed suspension rising through the mixing zone of the impeller.

The thus flocculant-treated suspension overflows the top end 30 of the mixing tank, then to follow a downward path in the surrounding feed well 25. The overflow edge of the mixing tank is located at a level just slightly below the overflow level "L" of the clarifier tank.

Vertical adjustability of the impeller unit allows the impeller blade to be located at a desired level in the mixing tank. For practical purposes the impeller is located advantageously at a level in the upper third of the mixing tank and preferably a distance of about such one third from the top overflow of the mixing tank.

In the FIG. 1 embodiment, the inner end of feed pipe 23 carrying the feed suspension penetrates the wall of the feed well 25, and may provide support for the mixing tank 24. Furthermore, in order to accommodate the herein exaggerated size of the mixing tank, the feed well 25 is shown eccentrically a distance $d$-2 from the vertical center line of the clarifier tank. However, for practical and average purposes, the diameter of the mixing tank need not be greater than about one third of the diameter of the feed well.

It is of practical significance in the operation of this invention that the cylindrical feed well 25 surrounding the mixing device be dimensioned with respect to diameter or cross-sectional flow area, as well as with respect to length or depth, in a manner whereby optimum results are attainable in regard to floc formation, clarity of the tank overflow, and maximum retention of the solids in the sludge.

For that purpose, the diameter of the feed well is such that the available cross-sectional downflow area thereof will accommodate a flow rate that will provide uniform solids distribution as well as optimum feed concentration across the flow area, without undue turbulence. A flow rate or flow velocity in the order of 4 to 5 ft. per minute is indicated to satisfy that requirement for average conditions involving clarification.

Optimum results are attainable if this flow velocity requirement is coupled with the requirement that the length or depth of the feed well be such as to terminate slightly above the top level of the sludge bed maintainable in the tank.

For this purpose, and with suitable controlled operation, the sludge bed may be defined as comprising a bottom zone indicated at $Z$-1 of final concentration, where the liquid held by and between the sludge solids cannot be furthermore reduced. This then is the final solids concentration at which the sludge is being withdrawn from the tank.

Above this bottom zone there is distinguishable the socalled Compression Zone indicated at $Z$-2 herein also termed a sludge blanket where there is still relatively slow downward movement of the solids in the liquid, as distinguished from solids that are in a free settling condition.

The requirement for optimum length of the feed well is met by the provision of a "Deep Feed Well" in the sense that it terminates only a short distance indicated at $d$-3 above a tentative top level of the aforementioned sludge blanket or "compression zone".

As the flocculated feed suspension issues from the feed well at a level close to the sludge blanket thus holding the issuing solids together, this combination of optimum cross-sectional flow area with optimum depth of the feed well cylinder is conducive to optimum floc preservation and optimum retention in the sludge bed or sludge blanket of the flocs along with smaller fragments and fines that may otherwise escape following a path to the peripheral tank overflow.

This mode of operation prevents the cumulative formation of a layer or haze of such intermediates above the sludge bed. The turbidity or lowered clarity of the tank overflow resulting from such a formation may require an additional solids removal or filtration operation to meet effluent clarity requirements. However, a build-up of such a condition is avoidable in the practice of this invention, and is the manner above set forth.

Effective flocculation requires that a sufficient amount of solids be contained in the feed suspension. Where the suspended solids are too few, as is frequently the case in industrial waste streams such as those initially herein mentioned, recirculation into the feed suspension of underflow sludge solids may be resorted to. For this purpose there is shown in the FIG. 1 embodiment a sludge recirculation line 32 leading from the sludge withdrawal pipe 13 to the feed pipe 23. By controlling the recirculation rate indicated through valve 33, the concentration of the feed suspension is accurately controllable. However, for best results the resulting feed concentration for a given condition should not exceed the solids concentration at which free settling of the solids occurs. Alternatively, recirculated sludge solids may be introduced into the mixing tank.

Figure 2:
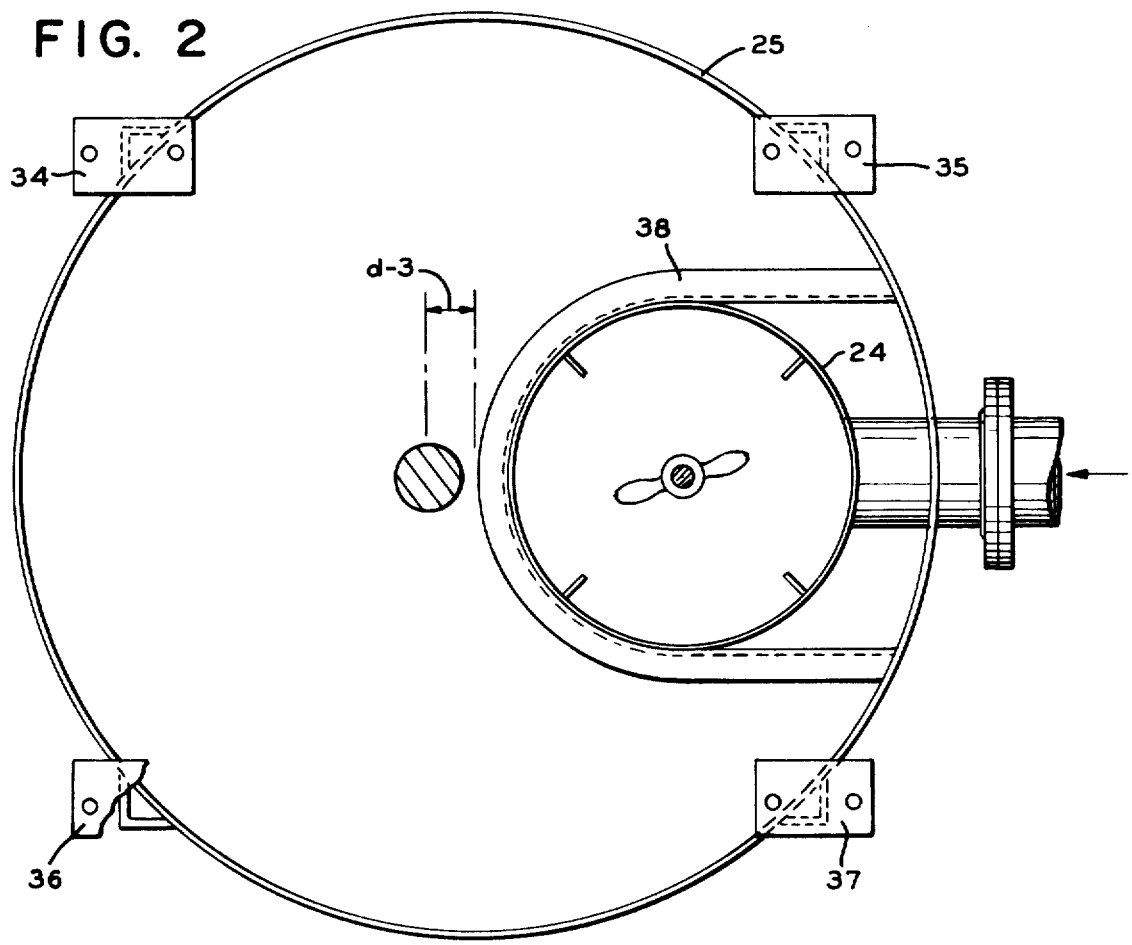
FIG. 2 is an enlarged cross-sectional detail view of the flocculating feed well, taken on line 2—2 in FIG. 1.

The enlarged cross-sectional detail view of the flocculating feed well appearing in FIG. 2 is shown to be structurally more fully implemented. Accordingly, the feed well 15 has two pairs of brackets 34, 35, 36 and 37 secured at the top with bolts (not shown) detachably connecting the feed well to the underside of the bridge. In order to accommodate the mixing tank 24, the feed well cylinder may be disconnected and moved to the right a distance $d$-3 off the vertical center line of the clarifier tank, and then reconnected to the underside of the bridge. Additional support for the mixing tank within the feed well 25 is in the form of a U-shaped member 38 hugging weld-connected to the inner face of the feed well 25.

In the greatly enlarged vertical sectional view of the flocculating feed well of FIG. 3, a feed well 39 is shown as concentric with the shaft 40 of the rake structure, and with sufficient space in the feed well available for accommodating a mixing device or flash mixer "M" in principle similar to the one in FIGS. 1 and 2. A mixing impeller 41 operates in a mixing tank 42 with the flocculating agent supplied through pipe 43 into the vortex 44 created by the impeller. However a supply pipe 45 for the feed suspension is shown to have an inner end lower portion 46 connected to the portion of the mixing tank, without penetration of the wall of the surrounding feed well cylinder, and also serving as support for the mixing tank. In this embodiment, the mixing tank has a conical bottom where any heavy stray solids may collect. Periodical removal of such collected solids may be effected through flanges cleanout neck 47 in the bottom, having a removable closure plate 48.

Here again, and for the reasons previously set forth, the feed well cylinder or "deep feed well" 39 terminates a short distance above the compression zone or sludge blanket 27 that overlies the zone of final solids concentration "Z-1" of the sludge bed in the tank.

Figure 4:
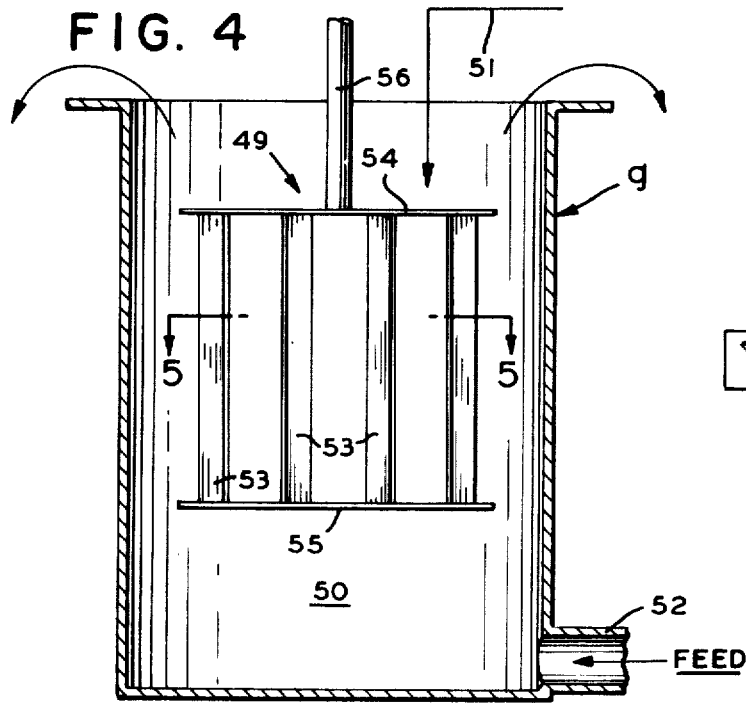
FIG. 4 is a vertical sectional view of another type mixing device applicable in this invention, provided with a gate type agitator.
Figure 5:
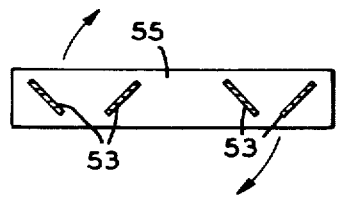
FIG. 5 is a cross-sectional detail view taken on line 5—5 in FIG. 4 of the gate type agitator.

Under conditions and with certain types of waste streams for example sewage or sewage effluent where sludge recirculation is employed, the use of the aforementioned flash mixers is contra-indicated, a smaller gate type mixer "g" may be employed, such as shown in FIGS. 4 and 5. This type of mixer has a paddle type agitator 49 rotated about a vertical axis in a mixing tank 50. A supply of flocculating reagent into the mixing tank is indicated at 51 from the top. A supply of the feed suspension 52 enters at the bottom of the mixing tank.

The agitator comprises a row of vertical agitator slats 53 angled with respect to one another, and rigidly interconnected at the top and at the bottom by horizontal members 54 and 55 respectively. The top member 54 of this agitating structure is fixedly connected to a vertical shaft 56 rotating the agitator structure at a speed appropriate for the particular condition involved.

In the practice of the invention, a distance Z-3 between the level of the sludge blanket and the lower end of the deep feed well, is controllable so as to obtain optimum results in respect to solids retention in the sludge blanket. Such control is attainable by controlling the rate of underflow sludge withdrawal as indicated by valve 33a, in relation to the feed rate and the feed solids concentration.

In practical operation it is preferable to maintain a distance Z-3 in the order of 8 to 12 inches for average conditions.

I claim:

1. A continuously operating settling tank which comprises in combination feed supply means for delivering an influent feed suspension to the tank, overflow means for supernatant liquid defining the overflow level of the tank, a tank bottom having a sludge collecting zone provided with sludge underflow discharge means, and operable to maintain in the tank a sludge bed comprising a bottom zone of final concentration and above it a sludge blanket or compression zone wherein solids are still in a state of downward movement as distinguished from a condition of free settling, a bridge structure spanning the tank, a rotary sludge raking structure having a vertical rake shaft, drive mechanism mounted upon said bridge structure, for supporting and rotating the rake structure, whereby sludge is moved over the tank bottom to said sludge discharge means, a feed well located in a central area of the tank, and having a throughflow area such that the flow velocity therein is insufficient to disturb the sludge blanket, while providing a quiescent flow transfer zone for descending freshly formed flocs, a separate stationary mixing tank having a closed bottom, located and supported in said feed well, so as to be surrounded by a suspension of freshly formed flocs descending in said feed well, said mixing tank adapted for rapid and thorough mixing therein of the feed suspension in the presence of a flocculating agent, said tank having an overflow edge being located at a level such as to cause the resulting mixture to overflow from the mixing tank immediately into and down through said quiescent floc transfer zone in the feed well, the downflowing suspension thus carrying freshly formed flocs descending to settle into said sludge blanket, with the carrier liquid separating outwardly towards said overflow means of the settling tank, a feed supply conduit for the feed suspension leading to the mixing tank, and arranged so that there is an upflow of said feed suspension in said mixing tank, flocculant feed means arranged for delivering said flocculating agent to said mixing tank, and mechanical mixing means cooperatively associated with said mixing tank, and operable so as to effect said rapid and thorough mixing of the flocculating agent with the feed suspension in said mixing tank, concurrent with the dispersal of the influent energy of said feed suspension in said mixing tank.

2. The settling tank according to claim 1, with the addition of means for recirculating sludge underflow solids through separate conduit means at a controlled rate to said feed suspension, whereby the solids concentration of said suspension is controllable.

3. The settling tank according to claim 1, wherein said mixing means comprise a flash mixing impeller type device creating a vertex in said mixing tank, wherein said means for delivering in the flocculating agent is arranged for delivery into said vortex, and wherein said feed connection is spaced downwardly from the impeller so that the feed suspension rises towards the impeller.

4. The settling tank according to claim 1, wherein said mixing means comprise a flash mixing impeller type device, exerting downward pumping action, wherein said feed connection for the feed suspension is spaced downward from the impeller, and wherein said mixing tank is dimensioned for a detention time of 30 seconds or less.

5. The settling tank according to claim 1, wherein said feed well is a deep feed well having a length terminating close to the top strata of said sludge blanket, and wherein the through flow area of said feed well is dimensioned to provide for a downward through flow velocity therethrough in the order of 4 to 5 ft/min.

6. The settling tank according to claim 1, wherein said feed conduit for the feed suspension leads to the bottom portion of the mixing tank, spaced downwardly from said flocculant feed means.

7. The settling tank according to claim 1, wherein said feed conduit for the feed suspension leads to a bottom portion of the mixing tank, and wherein said feed means for the flocculating agent are arranged for supplying a stream of said flocculating agent into a top zone of the mixing tank, for mixing with the upflowing suspension.

8. The settling tank according to claim 1, wherein said feed supply conduit for the feed suspension leads to a bottom portion of the mixing tank, wherein said feed means for the flocculating agent are arranged for supplying a stream of said flocculating agent from above into the mixing tank for mixing with the upflowing suspension, and wherein said agitating means comprise an impeller shaft arranged and operable to exert downward pumping action upon said flocculating agent against the upflowing feed suspension.

9. The settling tank according to claim 1, wherein said feed well is disposed concentric with said rake shaft.

10. The settling tank according to claim 1, wherein said feed well surrounds said rake shaft in eccentric relationship therewith.

11. The settling tank according to claim 1, wherein said feed well surrounds said shaft in eccentric relationship therewith, and wherein said mixing tank is disposed substantially concentric with said feed well.

12. The settling tank according to claim 1, wherein said rake shaft is surrounded by said feed well.

13. A continuously operating settling tank which comprises in combination feed supply means for delivering an influent feed suspension to the tank, overflow means for supernatant liquid defining the overflow level of the tank, a tank bottom having a sludge collecting zone provided with sludge underflow discharge means, and operable to maintain in the tank a sludge bed comprising a bottom zone of final concentration and above it a sludge blanket or compression zone wherein solids are still in a state of downward movement as distinguished from a condition of free settling, a rotary raking structure supported for rotation in the tank, whereby sludge is moved over the tank bottom to said sludge discharge means, drive means for rotating said rake structure, a feed well located in a central area of the tank, and having a through flow area such that the flow velocity therein is insufficient to disturb the sludge blanket, while providing a quiescent flow transfer zone for descending freshly formed flocs, a separate stationary mixing tank having a closed bottom located and supported in said feed well, so as to be surrounded by a suspension of freshly formed flocs, descending in said feed well, said mixing tank adapted for rapid and thorough mixing therein of the feed suspension with a flocculating agent supplied to the mixing tank, said tank having an overflow edge being located at a level such as to cause the resulting mixture to overflow from the mixing tank immediately into and down through said quiescent floc transfer zone in the feed well, the downflowing suspension thus carrying freshly formed flocs descending to settle into said sludge blanket, with the carrier liquid separating outwardly towards said overflow means of the settling tank, a feed supply conduit for the feed suspension leading to the mixing tank, and arranged so that there is an upflow of said feed suspension in said mixing tank, flocculant feed means arranged for delivering said flocculating agent to said mixing tank, and mechanical mixing means cooperatively associated with said mixing tank, and operable so as to effect said rapid and thorough mixing of the flocculating agent with the feed suspension in said mixing tank, concurrent with the dispersal of the influent energy of said feed suspension in said mixing tank.

14. The settling tank accordng to claim 13, wherein said feed conduit for the feed suspension leads to the bottom portion of the mixing tank, spaced downwardly from the zone of introduction of said flocculating agent, and wherein said means for rapid mixing are located so as to be effective in the zone of introduction of said flocculating agent.

15. The settling tank according to claim 13, wherein said feed conduit for the feed suspension leads to a bottom portion of the mixing tank, and wherein said feed means for the flocculating agent are arranged for supplying a stream of said flocculating agent into a top zone of the mixing tank, for mixing with the upflowing suspension, and wherein said mixing means for rapid mixing are located so as to be effective in the zone of introduction of said flocculating agent.

16. The settling tank according to claim 13, wherein said feed supply conduit for the feed suspension leads to a bottom portion of the mixing tank, wherein said feed means for the flocculating agent are arranged for supplying a stream of said flocculating agent from above into the mixing tank for mixing with the upflowing suspension and wherein said mixing means comprise an impeller shaft arranged and operable to exert downward pumping action from the zone of introduction of the flocculating agent against the upflowing feed suspension.

17. The method of continuously treating a stream of a solids suspension with flocculating chemicals to form said solids into settleable flocs, which method comprises, maintaining a body of liquid supplied by said stream undergoing continuous sedimentation and clarification, said body defined by a main overflow level for separated carrier liquid, and containing a sludge bed of controllable depth, comprising a bottom zone of final solids concentration and above it a sludge blanket or compression zone wherein solids are still in a state of downward movement as distinguished from a zone of free settling, maintaining in the central area of said body of liquid a self-contained mixing zone for receiving said suspension stream as well as a stream of flocculating chemicals, said zone being defined by a secondary overflow for delivery thereby of both said streams being combined in said mixing zone directly into a surrounding quiescent downflow transfer zone carrying freshly formed flocs, concurrent with the dispersal of the influent stream energy in said mixing zone, maintaining around said mixing zone a downflow transfer zone for receiving the mixture overflowing from said mixing zone for delivery of said flocs into said sludge blanket, while separated carrier liquid is delivered by said main overflow, feeding said suspension into said mixing zone, while supplying said stream of flocculating chemical to said mixing zone, rapidly mechanically mixing the combined streams in said mixing zone, in a manner to effect rapid and through distribution of the chemical in said suspension, while allowing the resulting mixture to overflow from said mixing zone immediately into and down through a surrounding quiescent zone, carrying said freshly formed flocs, said quiescent downflow zone being contained against the surrounding body of liquid, and maintaining in said quiescent zone a downflow rate low enought to avoid disturbance of the sludge blanket, while allowing the freshly formed descending flocs to settle into said sludge blanket, and the carrier liquid to separate outwardly towards said main overflow level of the settling tank.

18. The method according to claim 17, wherein said stream of feed suspension and said stream of flocculating chemicals are fed into said mixing zone countercurrently upwardly and downwardly respectively, and that said rapid mixing is effected in the zone of introduction of said chemicals.

19. The method according to claim 17, wherein underflow solids from said sludge bed are recirculated separately to said feed suspension at a rate controllable for adjusting the solids concentration of the feed suspension.

20. The method according to claim 17, wherein the downward flow velocity in said transfer zone is in the order of 4 to 5 ft/min.

21. The method according to claim 17, wherein
the feed suspension is caused to rise in said mixing zone against a stream of the flocculating chemical, said stream being subjected to a downwardly directed impeller pumping action.

* * * * *